United States Patent [19]

Acampora et al.

[11] 4,301,533

[45] Nov. 17, 1981

[54] TECHNIQUE FOR INCREASING THE RAIN MARGIN OF A TDMA SATELLITE COMMUNICATION SYSTEM

[75] Inventors: Anthony Acampora, Freehold; Douglas O. Reudink, Sea Girt, both of N.J.

[73] Assignee: Bell Telephone Laboratories, Incorporated, Murray Hill, N.J.

[21] Appl. No.: 97,870

[22] Filed: Nov. 27, 1979

[51] Int. Cl.³ .............................................. H04B 7/185
[52] U.S. Cl. ..................................... 370/104; 455/10; 455/103
[58] Field of Search ..................... 370/104; 455/10, 69, 455/103

[56] References Cited

U.S. PATENT DOCUMENTS

| Re. 28,577 | 10/1975 | Schmidt | 179/15 |
|---|---|---|---|
| 3,505,479 | 4/1970 | Hodge | 179/15 |
| 3,632,885 | 1/1972 | Herold | 179/15 |
| 3,634,628 | 1/1972 | Sekimoto | 179/15 |
| 3,649,764 | 3/1972 | Maillet | 179/15 |
| 3,676,778 | 7/1972 | Mori | 325/4 |
| 3,700,820 | 10/1972 | Blasbalg | 370/82 |
| 3,848,093 | 11/1974 | Edstrom | 179/15 |
| 3,928,804 | 12/1975 | Schmidt | 370/104 |
| 4,004,224 | 1/1977 | Noack | 455/10 |

OTHER PUBLICATIONS

*Datamation*; Jul. 1978; pp. 94-102; "The Future of Commercial Satellite Telecommunications", by W. White et al.

*Conference Record of the 26th Convention of Nuclear Electronics and Aerospace, Rome, Italy;* Mar. 9-18, 1979; pp. 22-24, Article by Carassa.

*Primary Examiner*—David L. Stewart
*Attorney, Agent, or Firm*—Erwin W. Pfeifle

[57] ABSTRACT

The present invention relates to a technique for increasing the rain margin of a satellite communication system which includes a satellite capable of transmitting multiple concurrent beams comprising time slot bursts in a TDMA mode. The present technique creates a small pool of TDMA time slots which are dedicated or formed at some instant of time by the rearrangement of traffic to permit the power normally transmitted in any portion of the multiple concurrent beams to be applied to one beam in a multiple fixed beam or limited scanning beam system or any portion of the beams which are directed at one ground station in a multiple unlimited scanning beam system for accessing a ground station experiencing, for example, a fade condition.

6 Claims, 4 Drawing Figures

TECHNIQUE FOR INCREASING THE RAIN MARGIN OF A TDMA SATELLITE COMMUNICATION SYSTEM

BACKGROUND OF THE INVENTION

1. Field of the Invention

The present invention relates to a technique for increasing the rain margin of a TDMA satellite communication system and, more particularly, to a technique which permits communication between ground stations of a TDMA satellite communication system via the satellite where one or more ground stations are experiencing a fade condition above the power margin.

2. Description of the Prior Art

The current trend in communication satellites appears to be increasingly toward the use of the 12/14 GHz and higher frequency bands and the uses of digital modulation formats with Time Division Multiple Access (TDMA) techniques. The former provides freedom from existing 4/6 GHz terrestrial interference and also provides higher antenna gain and narrower beams for a given size aperture, while digital transmission in conjunction with TDMA provides for more efficient utilization of the available satellite system resources.

A major drawback associated with 12/14 GHz systems is the signal attenuation associated with rainfall. In general, attenuation at these frequencies is an increasing function of rain rate, with the result that, for example, over a large portion of the United States, significant power margin must be provided to prevent excessive outage due to rain fades.

A typical prior art technique for overcoming rain fades is disclosed in an article "The Future of Commercial Satellite Telecommunications" by W. White et al in *Datamation*, July 1978 at pp. 94-102 which discloses at pp. 98-99 that it may be possible to overcome rain attenuation in satellite systems by transmitting the same burst several times. The ground station in the momentary rain zone can add the multiple signals for the same burst together to reconstruct the original signal.

Other standard techniques which might be employed to provide rain margin include (1) increasing the radiated power of the satellite and earth stations, (2) improving the noise figure of the receivers, (3) installing larger ground station antennas, and (4) providing site diversity. Unfortunately, these techniques (1)-(4) are costly in that permanently dedicated system resources are used only infrequently, i.e., when it rains. Therefore, the system has been tremendously overdesigned for the clear air conditions which might exist more than 99.9 percent of the time at any particular ground location if, for example, 15 or 20 dB rain margin is required to achieve the desired rain outage.

The problem remaining in the prior art is to provide method and apparatus which can increase the rain margin of a satellite communication system by as much as, for example, 10 dB without requiring additional system resources which are only infrequently called upon for use.

SUMMARY OF THE INVENTION

The foregoing problem has been solved in accordance with the present invention which relates to a technique for increasing the rain margin of a TDMA satellite communication system and, more particularly, to a technique that permits communication between ground stations of a TDMA satellite communication system via the satellite where one or more ground stations are experiencing a fade condition above the normal power margin without the requirement of additional system resources.

In accordance with the present invention, spare concurrent TDMA time slots in each frame sequence which are obtained from a pool or by rearrangement of spare time slot assignments are provided for use in communications with ground stations experiencing, for example, rain attenuation events which exceed a predetermined power margin.

Additional up-link power margin at a rain attenuation station can be achieved by either increased power transmission of the information in a normal burst or by the use of pool or rearranged spare time slots and field extension and coding techniques for burst extension and additional margin. Additional down-link power margin is provided in accordance with the present invention to a station experiencing a rain fade condition by the use of concurrent pool or rearranged spare time slots associated with each down-link beam frame format to permit the power normally transmitted in multiple concurrent beams from the satellite to be applied in effectively one or more beams directed at the ground station or stations experiencing the fade condition.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention is described hereinafter in relation to a time division multiple access (TDMA) satellite communication system comprising multiple fixed up-link and down-link beams. It is to be understood, however, that such description is exemplary only and is for purposes of exposition and not for purposes of limitation. It will be readily appreciated by those skilled in the art that the inventive concept is equally applicable to multiple scanning spot beam systems or combined fixed and scanning spot beam satellite systems.

Figure 1:
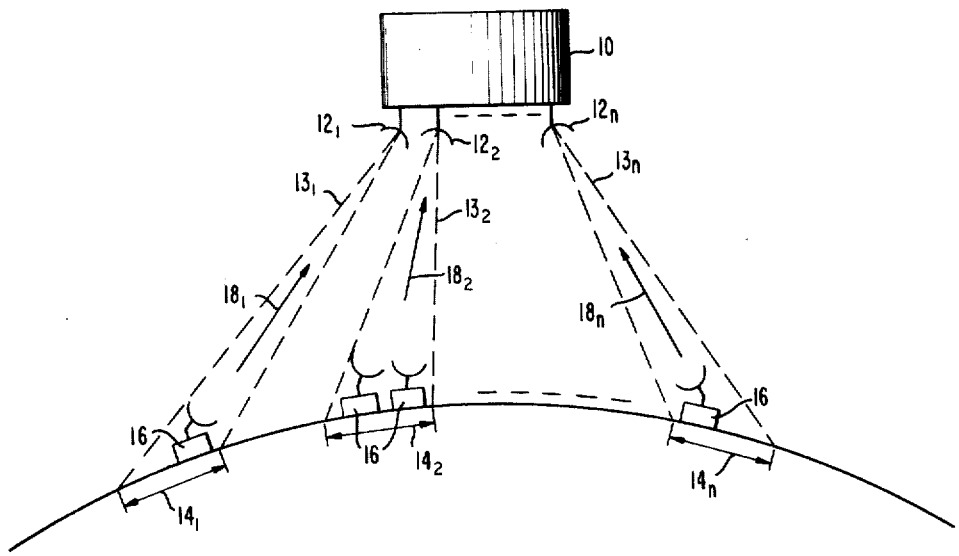
FIG. 1 illustrates a satellite communication system that uses a plurality of fixed spot beams to provide service to a plurality of ground stations.

As shown in FIG. 1, a multiple TDMA fixed beam satellite communication system, which is used hereinafter to describe the inventive concept, comprises a satellite 10 which includes a plurality of n antenna means $12_1$-$12_n$ each antenna means being capable of transmitting a separate one of a plurality of n down-link beams $13_1$-$13_n$ at a separate one of a plurality of n spaced-apart footprints $14_1$-$14_n$ on the surface of a celestial body.

Each footprint 14 includes one or more earth stations 16 which transmits its frame synchronized time slot bursts of information destined for other earth stations 16 in the system in an associated up-link beam $18_1$-$18_n$ in accordance with a predetermined TDMA frame format. The time slot bursts arriving concurrently in each of the up-link beams $18_1$-$18_n$ at satellite 10 are directed within the satellite 10 to the appropriate antenna means $12_1$-$12_n$ for retransmission in down-link beams $13_1$-$13_n$ to the proper destination earth station 16.

Figure 2:
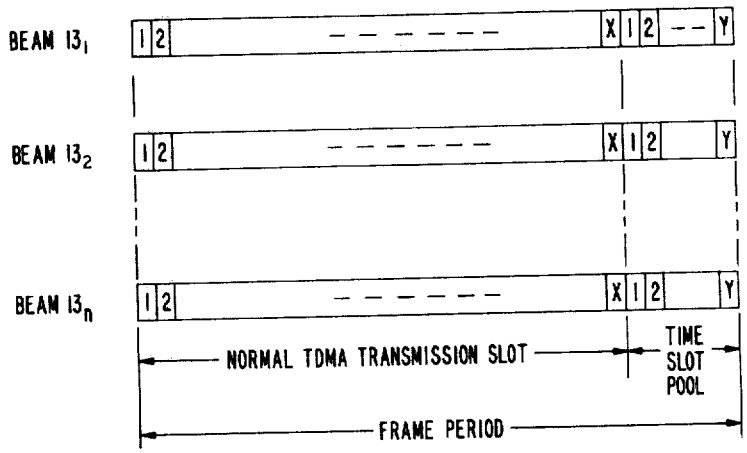
FIG. 2 illustrates a typical switching frame sequence for use in the present system in accordance with the present invention.

FIG. 2 illustrates an exemplary TDMA switching frame format which might be used to implement the present inventive concept to permit communication between the various ground stations 16 of the system via satellite 10. Shown at the front end of each frame period associated with down-link beams $13_1$-$13_n$ are a plurality of x time slots which are allocated to provide the normal two-way TDMA transmission channels between the various ground stations 16 of the system. Typical allocations of time slots in multiple beam frame formats are well known in the art which prevent concurrent transmissions to any one of the ground stations, and any suitable allocation scheme can be applied for time slots 1-x of the frame period of FIG. 2. Typically each time slot includes a message burst comprising preamble information, data or message information and possibly some post-amble information which is transmitted by one earth station 16 to satellite 10 and then to the destination earth station via the appropriate down-link beam 13.

Also included within each frame, but not shown in FIG. 2, are for example, dedicated time slots, which are used to establish two-way signaling channels between a ground station designated a master ground station and each of the remote ground stations in the network using any suitable technique known in the art. The signaling channels are used to, for example, enable TDMA synchronization, distribute system status information, handle new requests for service, assign time slots, etc. Except for the signaling slots, all of the other time slots can, if needed, be assigned upon demand.

Also shown at the end of the frames is a pool of y spare or unused time slots designated 1-y. As will be described hereinafter, these slots are to be made available to ground stations experiencing rain attenuation. It is to be understood that the spare or unused time slots can also be obtained in the proper time slot interval and sequence by rearranging the time slot assignments in a frame and using the signaling channels to inform each ground station of such rearrangement. The time slots from the pool can be made available to any ground stations experiencing up-link or down-link rain attenuation. However, a more attractive means for compensating for up-link fades is via up-link power control. For this approach, the up-link power during rain events is adjusted such that a constant incident power is maintained at the satellite. When the rain attenuation exceeds the margin provided by the maximum ground station transmitter power, fading occurs on the up-link. Since up-link power is usually not at a premium, the maximum transmitter power can often be set so as to overcome the fade condition. Thus, up-link power control represents a very attractive means for combating up-link loss of signal while maintaining a constant signal-to-interference ratio at the satellite. However, it is possible that certain ground stations are not capable of handing additional up-link power to overcome a fade condition due to the circuitry employed, in which case the use of reassigned spare time slots or pool time slots in conjunction with any known technique as, for example, encoding as described in U.S. Patent application Ser. No. 51,022 filed on June 22, 1979 for A. Acampora, can be used.

When a down-link fade occurs, the carrier-to-noise ratio at the receiving ground station experiencing the fade is no longer sufficient to maintain the desired bit error rate. Thus, the capacity into that ground station is reduced. Suppose, for example, the rain attenuation is such that the signal level falls 8 dB below the value required to maintain a voice grade bit error rate (BER) equal to, for example, $10^{-3}$. The channel error rate for Gaussian noise is then about 0.1. A lower bit error rate would result if both Gaussian noise and peak-limited interferencee set the error rate. The BER, however, can still be maintained at $10^{-3}$ or lower in accordance with the present invention.

When power measurements at a ground station indicate that attenuation exceeding the built-in power margin is imminent, then such ground station 16 uses the signaling link to notify the master ground station that a fade condition is about to occur. The master ground station then assigns concurrent time slots from the reserve pool of FIG. 2 or by reassigning traffic to obtain spare concurrent time slots in each frame format for use as will be described hereinafter.

For practical reasons, it might be desirable to limit the excess demand for voice circuits due to rain attenuation to a factor of four or five above the clear air demand. Then, outages will occur when the attenuation exceeds the additional rain margin provided by these extra circuits. Thus, when designing the network, the offered traffic must be contained to a level such that the desired rain outage and call blockage probability can be achieved by the satellite capacity C. Factors affecting this design would include the rain statistics at the various ground stations, the built-in rain margin, the number of ground stations, the clear air Erlang load of each ground station, and the statistical dependence of rain attenuation in excess of the built-in margin at the various ground stations.

Figure 3:
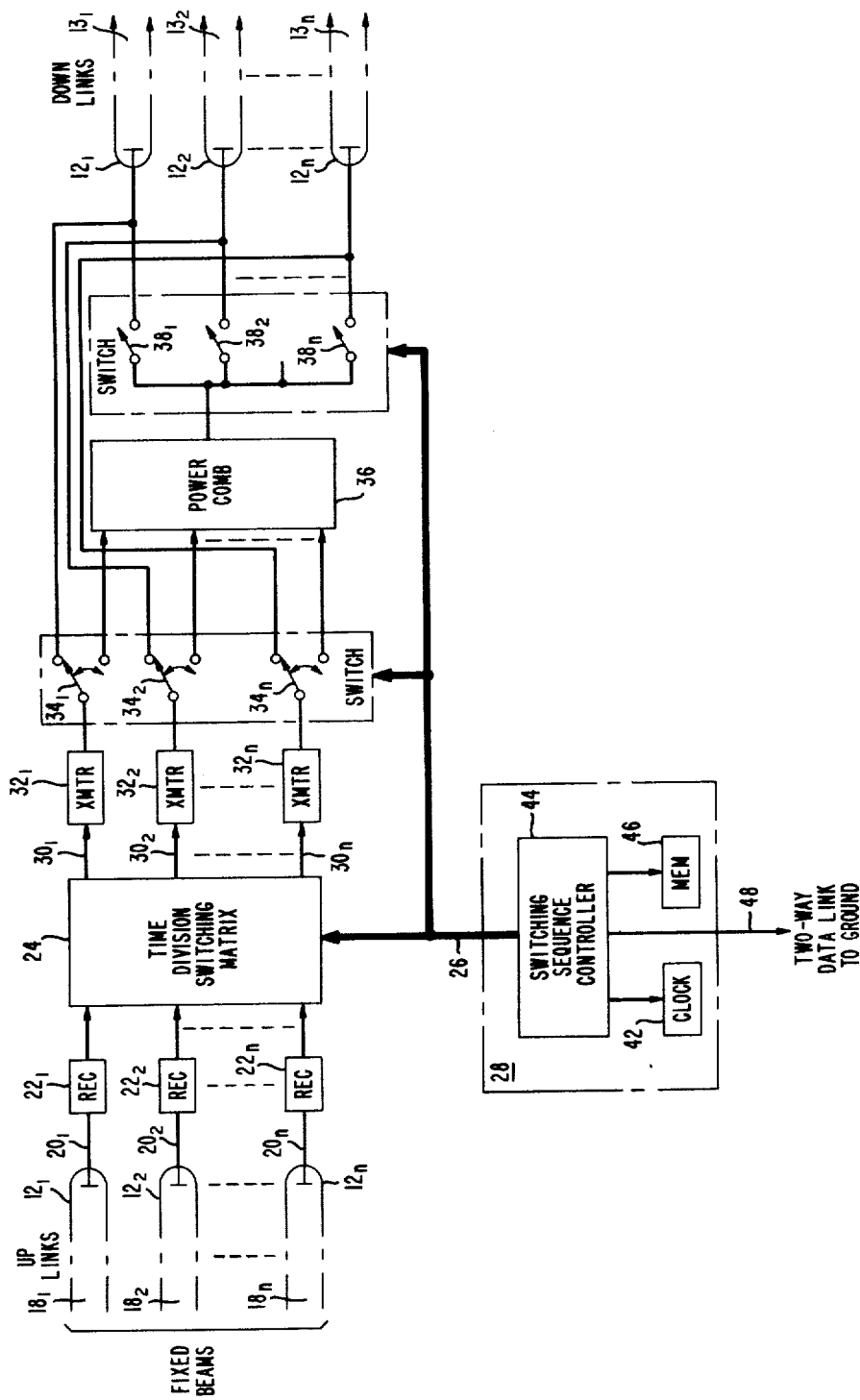
FIG. 3 illustrates a block diagram of a satellite repeater in accordance with the present invention for use in a multiple TDMA fixed or limited scan spot beam satellite communication system.

In accordance with the present invention, a rain margin in excess of the built in margin can be provided to one or more ground station experiencing a rain fade condition by the use of concurrent spare or pool time slots in each frame format to permit the power normally transmitted in the multiple down-link fixed beams $13_1$-$13_n$ from the satellite to be applied in one or more beams directed at the one or more ground station or stations experiencing the fade condition. FIG. 3 illustrates a block diagram of a satellite 10 in accordance with the present invention for use in the TDMA multiple fixed beam satellite communication system of FIG. 1 for providing excess rain margin in sequence to ground stations experiencing a fade condition.

In the arrangement of FIG. 3 each of the up-link fixed spot beams $18_1$-$18_n$ are shown being intercepted or received at antennas $12_1$-$12_n$, respectively, while each of the down-link fixed spot beams $13_1$-$13_n$, are launched by antennas $12_1$-$12_n$, respectively. It is to be understood that antennas $12_1$-$12_n$ can comprise any suitable antenna means capable of receiving or transmitting each of fixed spot beams $18_1$-$18_n$ and $13_1$-$13_n$, respectively, as, for example, a single reflector having the requisite aperture to cover all of the associated fixed spot beam geographical ground areas and a separate feedhorn for each fixed spot beams disposed on the focal plane of the reflector at a point where the associated fixed spot beam is focused by the reflector.

In accordance with the present invention, up-link signals concurrently received via fixed spot beams $18_1$-$18_n$ form separate input signals on leads $20_1$-$20_n$, respectively, to respective receivers $22_1$-$22_n$ and, in turn, to a time division switching matrix 24. These input signals are concurrently and selectively switched by the space and time division switching matrix 24, in response to control signals on bus 26 from a clock and switching sequencer 28, to the appropriate output lead $30_1$-$30_n$ for transmission via transmitter $32_1$-$32_n$, respectively.

Time division switching matrix 24 can comprise any suitable switching matrix which can provide high-speed switching with relatively low power requirements. Exemplary switches which have the desired characteristics are, for example, the well known microwave switches which include, inter alia, the semiconductor diode (PIN) switch and the magnetic latching switch.

In accordance with the present invention, the outputs of transmitters $32_1$-$32_n$ are coupled to switches $34_1$-$34_n$, respectively, which function to connect said outputs either directly to antennas $12_1$-$12_n$, respectively, or to separate inputs of a power combiner 36 in response to control signals on bus 26 from clock and switching sequencer 28. Power combiner 36 can compromise any suitable arrangment which functions to add the power of the input signals and generate an output signal representative of such combination which output signal is applied to the input of each of switches $38_1$-$38_n$. In response to an appropriate control signal on bus 26 from clock and switching sequencer 28 as will be described in more detail hereinafter, one of switches $38_1$-$38_n$ will be selectively closed to permit the output signal from power combiner 36 to be applied to the associated one of antennas $12_1$-$12_n$, respectively.

Clock and switching sequencer 28 comprises a clock circuit 42, a switching sequence controller 44 and a memory section 46. The clock circuit 42 is synchronized with all the system clocks at the remote ground areas via telemetry signals on a two-way data link 48 from one or more ground stations to permit effective reception and transmission of signals through satellite repeater 10 via switching matrix 24, and switches $34_1$-$34_n$ and $38_1$-$38_n$. Synchronization of the system clocks can be achieved using any suitable technique known in the art which, for example, can take the form of synchronization pulses which are transmitted via round trip telemetry signals through the satellite repeater 10 to the various ground stations. The switching sequence controller 44 of circuit 28 generates the necessary control signals to interconnect the appropriate input and output leads through switches of matrix 24 and switches $34_1$-$34_n$ and $38_1$-$38_n$ during each frame interval in response to the synchronized clock signals from clock 42 and the desired interconnection sequence representative of the sequence of FIG. 2 stored in the associated memory section 46. Any suitable high speed switching sequencer and memory means which is available can be used to generate the desired control signals.

In accordance with the present invention, when no fade condition exists at any of ground stations 16, the normal TDMA transmission format of FIG. 2 is carried out and the pool time slots are either not used to carry information or used on a demand assigned basis for increased traffic handling capability in a standard manner. Under such no fade condition at all stations 16, signals in the synchronized time slots of up-link beams $18_1$-$18_n$ are concurrently received at antennas $12_1$-$12_n$, pass through receivers $22_1$-$22_n$, are appropriately switched by matrix 24 under the control of clock and switching sequencer 28 in accordance with the switching sequence stored in memory 46 for each corresponding time slot of the frame format, pass through associated transmitters $32_1$-$32_n$, and clock and switching sequencer 28 sets switches $34_1$-$34_n$ to directly connect the outputs of transmitters $32_1$-$32_n$ to antennas $12_1$-$12_n$, respectively, for transmission of the time slot signals of the frame via down-link beams $13_1$-$13_n$ to the destined ground stations 16 in footprints $14_1$-$14_n$. Under such no fade condition, clock and switching sequencer 28 maintains switches $38_1$-$38_n$ in the open position.

When one of the ground stations 16 of the system is about to experience a fade condition, such ground station notifies the master ground station that such fade is about to occur via the signaling link, and the master ground station allocates a separate corresponding time slot in each of the n concurrent frame sequences from the time slot pool section for each time slot normally destined for that fading station in the normal TDMA transmission format area of FIG. 2. The master station then notifies all ground stations 16 in the system of the fade condition and which one of the allocated spare time slots will be used for each station's time slot bursts to the faded station. The master station also updates memory 46 in clock and switching sequencer 28 of satellite 10 to include the temporarily reassigned frame sequences for the fade condition.

In operation, then, for a fade condition at a ground station, the normal TDMA transmission format in time slots $1-x$ at the beginning of the frame period of FIG. 2 is carried out for the transmission of information to the non-faded stations. More particularly, concurrent time slots burst signals arriving in up-link beams $18_1$-$18_n$ are received at antennas $12_1$-$12_n$ and directed through receivers $22_1$-$22_n$, switching matrix 24, transmitters $32_1$-$32_n$ and switches $34_1$-$34_n$ directly to antennas $12_1$-$12_n$ by clock and switching sequencer 28 for transmission in down-link beams $13_1$-$13_n$ to the non-faded destination ground stations 16.

During each time slot interval allocated from pool time slots $1-y$ of FIG. 2 in each frame for transmission by one of the system ground stations to a ground station experiencing a fade condition in excess of the built-in margin, only the transmitting station allocated that time slot is sending its synchronized time slot burst destined for the faded ground station in its associated up-link beam 18 to satellite 10. At the satellite, this time slot burst is received at the antenna 12 associated with that up-link beam and is transmitted through the associated receiver 22 to the input of switching matrix 24. Since memory 46 of clock and switching sequencer 28 was updated by the master station to indicate that during this allocated time slot period a burst is expected from the assigned transmitting ground station to a particular faded receiving ground station, switching sequence controller 44 causes switching matrix 24 to direct that single input signal to each of the output leads $30_1$-$30_n$ for concurrent transmission through transmitters $32_1$-$32_n$. Controller 44 also causes switches $34_1$-$34_n$ to direct the outputs of transmittter $32_1$-$32_n$ through power combiner 36 and through the one particular switch 38 associated with the antenna 12 and down-link beam 13 associated with the faded station 16.

For purposes of illustration, it will be considered that station 16 of footprint $14_n$ of FIG. 1 has faded and that the master station has assigned time slots 1 and 2 of the pool time slots 1—y of FIG. 2 for a transmission of a time slot burst by station 16 of footprint $14_1$ and one of the stations 16 of footprint $14_2$, respectively, to the faded station. During time slot 1 of the pool time slots, ground station 16 of footproint $14_1$ is the only ground station transmitting to satellite 10. The time slot burst transmitted by station 16 in up-link beam $18_1$ is received at the satellite at antenna $12_1$ and is passed through receiver $22_1$ with all other antennas and receivers momentarily idle. Controller 44 causes switching matrix 24 to direct this time slot burst signal to all output leads $30_1$-$30_n$ simultaneously so that this signal is raised in power suitable for transmission by each of transmitters $32_1$-$32_n$. Controller 44 also causes the outputs during the present time slot interval of transmitters $32_1$-$32_n$ to be directed to the power combiner 36 where the signals from transmitters $32_1$-$32_n$ are combined into one output signal. Controller 44 also causes only switch $38_n$ to be closed so that the output signal from power combiner 36 is only applied to antenna $12_n$ for transmission in down-link beams $13_n$ to faded station 16 in footprint $14_n$.

Similarly in time slot 2 of the pool time slots, ground station 16 in footprint $14_2$ assigned to this slot transmits its time slot burst. At the satellite 10 this burst is received in up-link beam $18_2$ by antenna $12_2$ and passed through receiver $22_2$. Controller 44 causes switching matrix 24 to direct the output of receiver $22_2$ simultaneously to all ouptut leads $30_1$-$30_n$ and in turn to transmitters $32_1$-$32_n$ and to the inputs to power combiner 36. The combined output signal from power combiner 36 is directed by controller 44 only through switch $38_n$ for transmission by antennas $12_n$ in down-link beam $13_n$ to faded station 16 in footprint $14_n$. In this mannerr a single input signal to satellite 10 is amplified by all transmitters 32 and the amplified signals are combined to provide a 10 dB margin for overcoming a fade at a signal ground station 16.

The arrangement of FIG. 3 can also be applied to a multiple limited scanning spot beam satellite 10 by replacing antennas $12_1$-$12_n$ in both the up-link and down-link sections by antenna section $12_1$-$12_n$ which are capable of being directed by an array processor (not shown in FIG. 3) to each of the footprints $14_1$-$14_n$ associated with each up-link and down-link beam in accordance with a predetermined frame sequence format. The remainder of FIG. 3 would essentially be the same for such multiple limited scan spot beam satellite. It is to be understood that any suitable limited scan antenna means and processor for appropriately directing the associated limited scan beams can be used. A typical arrangement for such limited scan multiple beam antenna can be found, for example, in U.S. Patent application Ser. No. 33,734 filed on Apr. 26, 1979 for C. Dragone and assigned to the same assignee as the present application.

Figure 4:
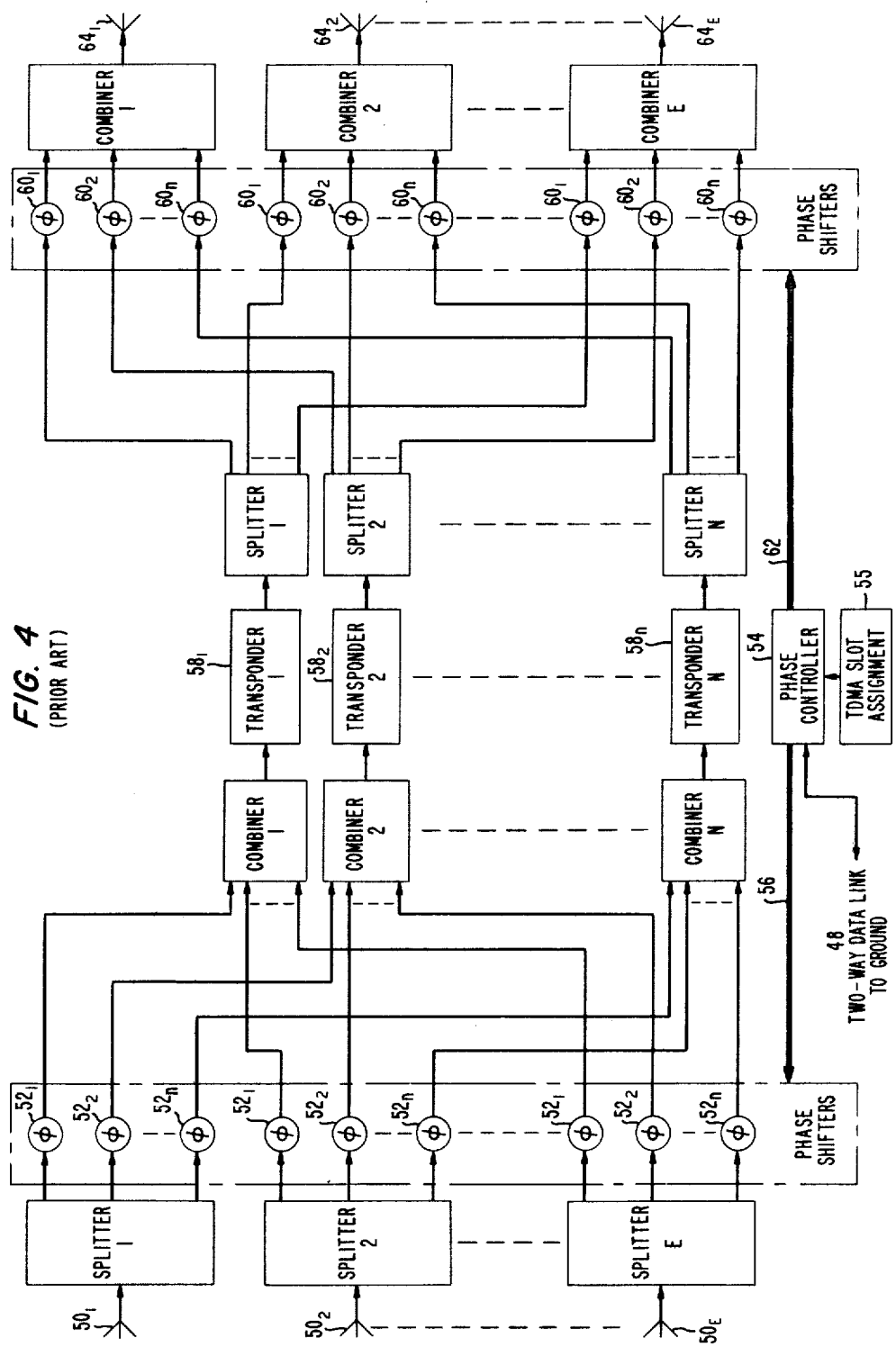
FIG. 4 illustrates a typical known block diagram of a satellite repeater for use in a multiple unlimited scan spot beam satellite communication system which can be adapted to practice the present invention.

In a typical multiple unlimited scanning spot beam satellite communication system the typical satellite repeater may appear as shown in FIG. 4 and disclosed in the article "Efficient Utilization of Satellite Transponders Via Time Division Multibeam Scanning" by A. S. Acampora et al in *The Bell System Technical Journal*, Vol. 57, No. 8, October 1978 at pp. 2901-2914. In the arrangement of FIG. 4, under normal conditions, n concurrent up-link signals are received at E receive antenna elements $50_1$-$50_E$ from remote and spaced apart ground stations. The signals received at each element 50 are split into n equal parts and each split signal part is applied to a separate one of a group of n phase shifters $52_1$-$52_n$. A phase controller 54 using TDMA time slot assignments stored in a memory 55, which can be updated via a two-way data link to the master station, transmits synchronized control signals over a bus 56 to cause corresponding phase shifters $52_1, 52_2, \ldots, 52_n$ in each of the E groups of phase shifters to be directed to receive only one of n possible signals received by the associated antenna element 50. The signals from corresponding ones of the phase shifters $52_1, 52_2, \ldots, 52_n$, in each of the E groups are then combined and applied as an input to a separate one of n transponders $58_1$-$58_n$.

In a reverse manner, the output from each of the n transponders $58_1$-$58_n$ is split into E parts and each part is applied to a separate corresponding one of n phase shifters $60_1, 60_2, \ldots, 60_n$ in each of E groups of phase shifters. The outputs from the n phase shifters $60_1$-$60_n$ in each of the E groups of phase shifters are then combined and applied as an input to a separate one of E antenna elements $64_1$-$64_E$. To generate the n down-link beams, phase controller 54 also transmits synchronized control signals over a bus 62 to cause corresponding phase shifters $60_1, 60_2, \ldots, 60_n$ in the E groups of phase shifters to introduce a predetermined phase shift in the signal passing therethrough during each time slot interval so as to cause the corresponding signal being transmitted by the E antenna elements $64_1$-$64_E$ to form a planar wavefront directed at a particular separate footprint in accordance with the predetermined frame format stored in memory 55.

A multiple unlimited scanning spot beam satellite communication system as shown in the exemplary arrangement of FIG. 4 could easily be adapted to provide the rain fade margin in accordance with the present invention. More particularly, a typical frame format as shown in FIG. 2 would be stored in TDMA slot assignment memory 55 and updated as required by the two-way data link to a master station to reassign pool time slots as ground stations enter or leave a fade condition. In accordance with the present invention, during the normal TDMA transmission format portion of FIG. 2, the satellite repeater would concurrently receive n bursts of information during each time slot interval at antenna elements $50_1$-$50_E$ for distribution via the E groups of n phase shifters $52_1$-$52_n$ in response to appropriate control signals from phase controller 54 to the n transponders $58_1$-$58_n$ as outlined hereinbefore. The outputs from transponders $58_1$-$58_n$ are distributed to the associated corresponding ones of the E groups of n phase shifters $60_1$-$60_n$ where the phases are adjusted in response to appropriate control signals from controller 54 to cause the E antenna elements $64_1$-$64_E$ to generate n beams in n different directions towards the n destination ground stations in the manner outlined hereinbefore.

During a time slot associated with the time slot pool of FIG. 2 which has been assigned for use in transmission between two stations where one or both stations are experiencing a fade condition, phase controller 54 would implement the technique of the present invention by transmitting control signals which would cause each phase shifters $52_1$-$52_n$ and $60_1$-$60_n$ of each group of phase to direct the n beams formed by such individual phase shifts at corresponding phase shifters of the E groups at the transmitting and receiving ground station assigned to such pool time slot. In this manner the single ground station assigned to transmit during a pool time slot has its burst received at antenna elements $50_1$-$50_E$ and directed by the E groups of n phase shifters to the n transponders $58_1$–$58_n$ for concurrent processing. This same signal at the outputs of the n transponders is then passed through the E groups of n phase shifters where the phases are appropriately adjusted in response to control signals from controller 54 to cause the antenna elements $64_1$–$64_E$ to launch n planar phase fronts all directed at the same receiving faded ground station.

It is to be understood that the above-described embodiments are simply illustrative of the principles of the invention. Various other modifications and changes may be made by those skilled in the art which will embody the principles of the invention and fall within the spirit and scope thereof. It is to be further understood that the present invention can be used by itself to obtain, for example, 10 dB rain margin or in conjunction with coding techniques for burst extension to obtain, for example, 20 dB of extra rain margin. The only criteria in accordance with the present invention is that the power of multiple transmitters at the satellite be combined and used for transmission to a particular receiving ground station to overcome, for example, the fade condition.

It is to be further understood that the description hereinabove regarding the use of concurrent time slots from the time slot pool of FIG. 2 has been directed to the passage of a signal from a transmitting ground station concurrently through all of the n transmitters $32_1$–$32_n$ of FIG. 3 or the n transponders $58_1$–$58_n$ of FIG. 4 for transmission in an effective single down-link beam to a designated receiving ground station for purposes of exposition and simplicity of presentation and not for purposes of limitation. It can readily be appreciated by those skilled in the art that the arrangement of FIGS. 3 and 4 can be easily modified along with the ground stations to permit up-link signals from more than one transmitting ground station to be concurrently received at antennas $12_1$–$12_n$ of FIG. 3 or $50_1$–$50_E$ of FIG. 4, with each up-link signal concurrently received being directed to a separate portion of the plurality of transmitters $32_1$–$32_n$ of FIG. 3 by matrix 24 or transponders $58_1$–$58_n$ by phase shifters $52_1$–$52_n$, with the power from each of the separate portions of the transmitters or transponders being directed in an effective separate down-link beam to a separate designated receiving ground station to accommodate, for example, partial fades at more than one station and provide a most efficient system.

To implement such capability, each ground station would include a fade detector, which is well known in the art. Such fade detector would measure the depth of fade occurring at any instant of time and when a predetermined depth of fade has been measured, that station would notify the master ground station of the occurrence of such partial fade and the indicated depth of the fade which would be updated periodically as the depth of fade either increased or decreased. The master ground station would then determine, via, for example, a look-up table in a computer memory, just how many transmitters 32 or transponders 58 would be required to provide sufficient combined power to overcome such partial fade condition. The master ground station would then assign spare time slots from the pool, which permitted use of that amount of spare transmitters or transponders, to each transmission to such partially faded ground station. Such assignment of pool time slots would be transmitted to each of the affected ground stations and to the satellite and, in addition, the particular transmitters or transponders to be used during each pool time slot would be sent to controllers 44 or 54 via the two-way data link 48 for storage in memory 46 or 55, respectively. Other ground stations concurrently experiencing a partial fade condition could similarly be assigned to the unassigned or idle transmitters or transponders during each of the pool time slots to enable more than one partially faded ground station to be concurrently serviced and thereby provide a most efficient system where transmitter or transponder power is ideally allocated as required. The circuitry for implementing such modification are well known and any suitable arrangement can be used.

Since FIG. 3 only illustrates a satellite capable of directing n up-link signals to n-down-link beams or one up-link signal through all transmitters $32_1$–$32_n$ and then to one down-link beam, the following modificatin would be necessary to permit concurrent partial fade conditions at more than one ground station to be accommodated. Primarily multiple power combiners 36 and switches $38_1$–$38_n$ would be arranged in parallel with switches $34_1$–$34_n$ being replaced by a switching matrix that could direct the output from each of the transmitters 32 to either the associated antenna $12_1$–$12_n$ directly or to the input of the proper combiner under the direction of controller 44. The controller 44 would also close the proper switch 38 of the group of switches $38_1$–$38_n$ associated with each used power combiner during each pool time slot interval. In FIG. 4 phase controller 54 need only provide the proper phase control signals to phase shifters $52_1$–$52_n$ of each group, and similarly phase shifters $60_1$–$60_n$ of each group, to direct each of two or more concurrently received up-link signals to each assigned portion of the transponders $58_1$–$58_n$ and then to the proper down-link directional beam to service more than one partially faded station concurrently in each pool time slot interval.

Additionally, the arrangement of FIG. 4 can be modified to remove the n transponders $58_1$–$58_n$ from the positions shown and, in turn, directly connect the associated combiners and splitters and place E amplifying means directly in the E paths between the E combiners and the E down-link antenna ports $64_1$–$64_E$, respectively, as shown, for example, in FIG. 1 of the article "Digital Error Rate Performance of Active Phased Array Satellite Systems" by A. Acampora in *AP-S International Symposium Record* of Oct. 11–15, 1976 given at the University of Massachusetts at Amherst, Mass., Session 10B at pp. 339–342.

We claim:

1. A satellite arrangement for use in a TDMA multiple beam satellite communication system wherein multiple ground stations (16) normally operate to communicate with one another via the satellite using separate time slot burst intervals during a predetermined frame fromat, the satellite arrangement comprising:
   a plurality of up-link antenna ports ($12_1$–$12_n$, FIG. 3; $50_1$–$50_E$, FIG. 4) capable of receiving up to n concurrent time slot bursts during each burst interval of the frame format from separate spaced-apart ones of the ground stations;
   a plurality of down-link antenna ports ($12_1$–$12_n$, FIG. 3; $64_1$–$64_E$, FIG. 4) capable of launching each of the concurrently received time slot bursts towards the appropriate destination ground station;
   means (24, 34, 38, FIG. 3; $52_1$–$52_n$ and $60_1$–$60_n$, FIG. 4) capable of directing each of the received time slot bursts between the appropriate up-link and down-link antenna ports;

a plurality of amplifying means ($32_1$–$32_n$, FIG. 3; $58_1$–$58_n$, FIG. 4) coupled to the directing means, each amplifying means being disposed to amplify the received time slot bursts directed thereto by the directing means prior to delivery to the appropriate down-link antenna port; and a controller (28, FIG. 3; 54, FIG. 4) capable of generating control signals to the directing means for causing the directing means to appropriately switch the received time slot bursts during each burst interval of the frame format between the appropriate up-link and down-link antenna ports via the plurality of amplifying means characterized in that the controller comprises means capable of generating both (a) first control signals to the directing means during certain predetermined time slot intervals of the frame format to cause the directing means to switch each of a plurality of n time slot bursts concurrently received at the up-link antenna ports through a separate one of the plurality of amplifying means for launching by the down-link antenna ports in a separate one of a plurality of n down-link beams to a separate destination ground station, and (b) second control signals to the directing means during the remaining predetermined time slot burst intervals of the frame format to cause the directing means to switch each of r concurrently received up-link time slot bursts, where $n > r > 1$, between the up-link and down-link antenna ports through a separate predetermined number of amplifying means taken from the plurality of amplifying means before each of the r time slot bursts is directed to a separate one of r destination ground stations with the combined power of said separate predetermined number of amplifying means.

2. A satellite arrangement in accordance with claim 1 wherein each of the plurality of up-link and down-link antenna ports ($12_1$–$12_n$, FIG. 3) comprises n antenna ports where each antenna port is capable of covering only a limited different portion of the multiple ground stations within a field of view of the satellite arrangement, and the directing means comprises a time division switching matrix (24) comprising n input terminals coupled to the n up-link antenna ports, respectively, and n output terminals coupled to the plurality of amplifying means comprising n means, respectively, characterized in that the satellite arrangement further comprises:

a plurality of r power combining means (36, FIG. 3), each power combining means being capable of combining the power of signals concurrently applied to any of a plurality of input terminals thereof and applying the combined power signal to an output terminal thereof; and the directing means further comprises:

a first switching means ($34_1$–$34_n$) capable of switching (a) each of the outputs from the plurality of n amplifying means directly to a separate one of the n down-link antenna ports in response to a first control signal from the controller, and (b) each of the outputs from a predetermined number of the plurality of n amplifying means associated with a same one of the received time slot bursts to a separate one of the input terminals of a separate one of the plurality of r power combining means in response to a second control signal from the controller; and a plurality of r second switching means ($38_1$–$38_n$, FIG. 3), each second switching means being coupled to the output of a separate one of the plurality of r power combining means and responsive to a second control signal from said controller for selectively directing the output from said separate one of the plurality of r power combinging means to a desired one of the down-link antenna ports.

3. A satellite arrangement in accordance with claim 1 wherein each of the plurality of up-link and down-link antenna ports ($50_1$–$50_E$ and $64_1$–$64_E$, FIG. 4) comprises E antenna ports forming a phased feed array, characterized in that the directing means comprises:

a first group of n phase shifters ($52_1$–$52_n$, FIG. 4) associated with each of the up-link antenna ports wherein corresponding phase shifters in each first group are (a) responsive to the first control signals from the controller to enable each of n signals received from n burst directions, respectively, at the up-link phased array to be directed through a separate one of the plurality of amplifying means and to an associated one of the plurality of down-link antenna ports, and (b) responsive to second control signals from the controller to enable each of r signals received from each of r separate directions, respectively, at the up-link phased array to be directed through a predetermined number of separate amplifying means taken from the plurality of amplifying means; and a second group of n phase shifters ($60_1$–$60_n$, FIG. 4) associated with each of the down-link antenna ports wherein corresponding phase shifters in each second group are (a) responsive to the first control signals from the controller to enable the output from each of the plurality of amplifying means to be selectively launched by the down-link phased array in a different direction towards a separate one of the multiple ground stations, and (b) responsive to the second control signals from the controller to enable the output from each of the plurality of amplifying means to be selectively launched by the down--link phased array in a separate beam which is directed at an associated one of r separate destination ground stations.

4. A method of increasing the rain margin in a TDMA satellite communication system comprising multiple ground stations which normally communicate with one another via a satellite using separate time slot burst intervals during a predetermined frame format of multiple burst intervals, the satellite comprising a plurality of up-link antenna ports ($12_1$–$12_n$, $50_1$–$50_E$) and a plurality of down-link antenna ports ($12_1$–$12_n$, $64_1$–$64_E$) capable of concurrently receiving and transmitting, respectively, a plurality of n beams associated with the various ground stations, a directing means (24, 34, 38; $52_1$–$52_n$ and $60_1$–$60_n$) capable of directing each of the received time slot bursts between the appropriate up-link and down-link antenna ports, and a plurality of amplifying means ($32_1$–$32_n$, FIG. 3; $58_1$–$58_n$, FIG. 4) capable of amplifying received time slot bursts directed thereto by the directing means by a predetermined amount, characterized in that the method comprises the steps of:

(a) during a fade condition at a particular one of the receiving ground stations, receiving at the up-link antenna ports an up-link beam from a ground station desiring to communicate with the ground station experiencing the fade condition during a predetermined time slot burst interval of the frame format;

(b) activating the directing means to distribute the signal received in the predetermined time slot burst interval of step (a) to a predetermined number of the plurality of amplifying means for separately amplifying the burst interval signal in each of the predetermined number of amplifying means by said predetermined amount and for directing the combined power generated by said predetermined number of amplifying means to the down-link antenna ports for launching toward the destination ground station experiencing the fade condition.

5. A method of increasing the rain margin in accordance with claim 4 wherein each of the plurality of up-link and down-link antenna ports is capable of covering only a limited different portion of the multiple ground stations, characterized in that in performing step (b), using the steps of:

(c) activating the directing means to direct the signal received in the time slot burst interval of step (a) to a predetermined number of the plurality of amplifying means;

(d) amplifying each of the signals applied to each of the predetermined number of amplifying means to a predetermined normal power level;

(e) combining the amplified signals of step (d) into a combined output signal; and (f) transmitting the combined output signal of step (e) from the appropriate one of the plurality of down-link antenna ports toward the ground station experiencing the fade condition.

6. A method of increasing the rain margin in accordance with claim 4 wherein each of the plurality of up-link and down-link antenna ports ($50_1$-$50_E$ and $64_1$-$64_E$) comprises E antenna ports forming a phased feed array and each element of each array has associated therewith a group of n phase shifters ($52_1$-$52_n$ and $60_1$-$60_n$)

characterized in that in performing step (b) using the steps of:

(c) activating corresponding phase shifters in each group of phase shifters associated with the up-link phased feed array to enable the signal received in the beam of step (a) to be delivered to a predetermined number of the plurality of amplifying means;

(d) amplifying the received signal applied to each of the predetermined number of amplifying means to a predetermined normal power level;

(e) activating corresponding phase shifters in each group of phase shifters associated with the antenna ports of the down-link phased feed array to enable the amplified signal from each of the predetermined number of amplifying means to be launched in a spearate beam directed at the ground station experiencing the fade condition.

* * * * *